Patented Oct. 3, 1939

2,174,761

UNITED STATES PATENT OFFICE 2,174,761

CONDENSATION PRODUCTS DERIVED FROM HYDROXY COMPOUNDS AND METHOD OF PRODUCING THEM

Hermann Schuette, Mannheim, and Max Wittwer, Ludwigshafen-on-the-Rhine, Germany, assignors to I. G. Farbenindustrie Aktiengesellschaft, Frankfort-on-the-Main, Germany No Drawing. Original application April 13, 1935, Serial No. 16,259. Divided and this application February 15, 1939, Serial No. 256,556. In Germany April 19, 1934

9 Claims. (Cl. 260—458)

The present application is a divisional application of our copending application Ser. No. 16,259, filed April 13, 1935, which relates to new, valuable, condensation products which are suitable as assistants for the textile and related industries, and a process of producing same.

We have found that valuable, water-soluble (which term includes colloidally soluble) condensation products can be obtained by reacting an organic compound containing at least one hydroxy group in the molecule, with a compound capable of acting as an alkylene oxide free from other oxygen than the oxide oxygen and containing at least three carbon atoms in the molecule, and effecting a "water-solubilizing step". The term "compound capable of reacting as an alkylene oxide free from other oxygen than the oxide oxygen and containing at least three carbon atoms in the molecule" comprises alkylene oxides with the said number of carbon atoms themselves, furthermore 1.2-propylene glycol and its higher homologues.

Suitable initial materials containing hydroxyl groups are, for example, alcohols such as propyl, amyl, octyl, dodecyl, cetyl and oleyl alcohol, montanol, 7.18-octodecane-diol, benzyl alcohol, cyclohexanol and decahydronaphthol. Aromatic hydroxy compounds, such as phenols, cresols, naphthols and hydroxyanthracenes, may also be employed. Also hydroxyalkylamines such as triethanolamine or cyclohexyldiethanolamine are suitable initial materials. The said alcohols may also contain substituents, such as, for example, halogen atoms, nitro or sulphonic groups.

The water-solubilizing step which is to be applied to the products consists preferably in reacting them with a compound capable of reacting as a polyhydric alcohol of low molecular weight, usually with from 2 to 4, preferably with 2 carbon atoms per molecule and containing one hydroxyl group per each carbon atom. As such compounds may be mentioned ethylene glycol or ethylene oxide, which are preferably employed in great excess; polyglycol ether radicles, such as, for example, diethylene, triethylene or tertrethylene glycol or polyglycerine, may also be introduced. In many cases it is advantageous to cause several of the said compounds to enter into reaction, preferably in several stages.

If the said preferred form of effecting the water-solubilizing step is employed the sequence of the condensation with the compound capable of reacting as an alkylene oxide free from other oxygen than the oxide oxygen and containing at least 3 carbon atoms in the molecule and the said water-solubilizing step may be as desired. In other words, the entire process consists in acting on the said organic initial material containing at least one hydroxy group in any desired order with two different compounds, namely a compound capable of reacting as an alkylene oxide free from other oxygen than the oxide oxygen and containing at least three carbon atoms in the molecule and with a compound capable of reacting as a low molecular polyhydric alcohol containing one hydroxyl group per each carbon atom or, speaking in greater detail, the compounds containing hydroxy groups may be first reacted with alkylene oxides containing at least three carbon atoms and then with polyhydric alcohols of low molecular weight or the procedure may be reversed by first causing the polyhydric alcohols of low molecular weight to react with the compounds containing hydroxy groups, the resulting condensation products thereupon being reacted with the alkylene oxides containing at least three carbon atoms in the molecule. When the resulting condensation products are not sufficiently soluble in water, they may be readily converted into a water-soluble condition by sulphonation or by the introduction of other groups capable of rendering them water-soluble.

In the condensation of the said initial material with the compound capable of reacting as an alkylene oxide containing at least three carbon atoms, preferably several molecular proportions of the latter (for example of propylene oxide) are used for each molecular proportion of the initial material. The reaction is preferably effected in the presence of condensing agents, such as caustic soda solution, caustic potash solution, sodium ethylate, sodium acetate or activated bleaching earths, advantageously at elevated temperature and if desired under pressure. Instead of the said alkylene oxides, compounds which act in the same way, such as 1.2-propyleneglycol, may be employed. The alkylene oxide or like molecules probably add on to each other with the formation of ether-like chains of high molecular weight.

The condensation with the compounds capable of reacting as polyhydric alcohols of low molecular weight is also advantageously carried out in the presence of the said condensing agents at elevated temperature and it is also preferable to work under increased pressure.

If compounds containing at least one hydroxy group are employed as are high molecular (which contain at least 6, preferably at least 8, advantageously from 8 to 18 carbon atoms per molecule) the water-solubilizing step may consist in a sulphonation; this is effected in the usual manner by treating the products with sulphuric acid, oleum, sulphur trioxide or chlorsulphonic acid, if desired in the presence of solvents or diluents or while adding compounds capable of withdrawing water.

The products obtainable according to the present invention are suitable, for example, as wetting, washing, dispersing, levelling, softening and like agents in the textile, leather, paper, lacquer, rubber and like industries; they are also capable of employment with advantage in the cosmetic and pharmaceutical industries in many cases. They have in particular a high protective colloid action and, for example, prevent to a great extent the separation of calcium soaps when working with soaps in hard water. Many of the products are also suitable as superfatting agents for soaps. The products may be advantageously employed together with other substances usually employed in the textile, leather, paper and like industries, for example, with soaps, Turkey red oils, true aliphatic sulphonic acids of high molecular weight, alkylated aromatic sulphonic acids, organic solvents, such as cyclohexanol, cyclohexanone, benzyl alcohol and carbon tetrachloride, or salts, such as Glauber's salt, alkali metal phosphates, waterglass and borates. They may also be employed together with oxidizing and reducing agents, such as sodium hypochlorite and sodium hydrosulphite, or with vegetable mucilages, glue, starch or ethylene oxide polymerization products. The following examples will further illustrate the nature of this invention, but the invention is not restricted to these examples. The parts are by weight.

Example 1

1 molecular proportion of cetyl alcohol is condensed with 6 molecular proportions of propylene oxide and subsequently with 2 molecular proportions of ethylene oxide at about 140° C. under pressure. 1 molecular proportion of the product obtained is dissolved in 10 times its weight of carbon tetrachloride and then 1 molecular proportion of chlorsulphonic acid is allowed to flow into the solution at a temperature below 10° C. As soon as a sample withdrawn is soluble in water, the whole is poured into icewater, the ether evaporated off and the aqueous solution neutralized with alkali or organic amines. The solution thus obtained may be directly employed for washing loose wool. By evaporating the neutral solution, a good washing agent is obtained in a solid form.

A satisfactory washing agent is also obtained if cetyl alcohol is condensed under the said conditions with 4 molecular proportions of propylene oxide (not with ethylene oxide), sulphonation and working up being carried out in the manner indicated above.

Example 2

From about 16 to 20 molecular proportions of ethylene oxide are caused to react in a stirring vessel at 140° C. in the presence of 0.5 per cent of caustic soda solution of 40° Bé. strength with 1 molecular proportion of the water-insoluble condensation product from 1 molecular proportion of cetyl alcohol and 4 molecular proportions of propylene oxide (the preparation of which condensation product is described at the beginning of Example 1). The wax-like reaction product has a good solubility in water and is an excellent protective colloid since it prevents the precipitation of calcium soaps in hard water; furthermore the product has a good equalizing action in vat-dyeing.

Example 3

2 molecular proportions of propylene oxide are caused to react with 1 molecular proportion of dodecyl alcohol. 1 per cent of caustic soda or dimethylaniline is added to the reaction product obtained and from 4 to 6 molecular proportions of ethylene oxide are reacted therewith in a pressure-vessel. The resulting product is a very suitable addition in the preparation of pastes, creams and the like by means of vaseline, soft paraffin wax, paraffin oil, wool fat and the like.

What we claim is:

1. The process of producing condensation products which comprises reacting an organic compound containing at least one hydroxy group in the molecule with a compound capable of acting as an alkylene oxide free from other oxygen than the oxide oxygen containing at least three carbon atoms in the molecule, and effecting a water-solubilizing step.

2. The process of producing condensation products which comprises reacting an organic compound containing at least one hydroxy group in the molecule in any desired sequence with a compound capable of acting as an alkylene oxide free from other oxygen than the oxide oxygen containing at least three carbon atoms in the molecule, and a compound capable of reacting as a low molecular polyhydric alcohol containing one hydroxy group per each carbon atom.

3. The process of producing condensation products which comprises reacting an organic compound containing at least one hydroxy group in the molecule in any desired sequence with a compound capable of acting as an alkylene oxide free from other oxygen than the oxide oxygen containing at least three carbon atoms in the molecule, and a compound capable of reacting as a polyhydric alcohol with from 2 to 4 carbon atoms per molecule and containing one hydroxy group per each carbon atom.

4. The process of producing condensation products which comprises reacting an organic compound containing at least one hydroxy group in the molecule in any desired sequence with a compound capable of acting as an alkylene oxide free from other oxygen than the oxide oxygen containing at least three carbon atoms in the molecule, and a compound capable of reacting as a polyhydric alcohol with from 2 to 4 carbon atoms per molecule and containing one hydroxy group per each carbon atom and treating the product obtained with a sulphonating agent.

5. The process of producing condensation products which comprises reacting an organic compound containing at least 6 carbon atoms and at least one hydroxy group in the molecule with a compound capable of acting as an alkylene oxide free from other oxygen than the oxide oxygen containing at least three carbon atoms in the molecule, and with a sulphonating agent.

6. Condensation products derived from an organic compound containing at least one hydroxy group in the molecule and from a compound capable of acting as an alkylene oxide free from other oxygen than the oxide oxygen containing at least three carbon atoms in the molecule, and containing at least one water-solubilizing group.

7. Condensation products derived from an organic compound containing at least one hydroxy group in the molecule, from a compound capable of acting as an alkylene oxide free from other oxygen than the oxide oxygen containing at least three carbon atoms in the molecule, and a compound capable of reacting as a low molecular polyhydric alcohol containing one hydroxy group per each carbon atom.

8. Condensation products derived from an organic compound containing at least one hydroxy group in the molecule, from a compound capable of acting as an alkylene oxide free from other oxygen than the oxide oxygen containing at least three carbon atoms in the molecule, and a compound capable of reacting as a low molecular polyhydric alcohol containing one hydroxyl group per each carbon atom, the said condensation products containing at least one sulphuric acid derivative group selected from the class consisting of the sulphuric acid ester and sulphonic acid group.

9. Condensation products derived from an organic compound containing at least 6 carbon atoms and at least one hydroxy group in the molecule and from a compound capable of acting as an alkylene oxide free from other oxygen than the oxide oxygen containing at least three carbon atoms in the molecule and containing at least one sulphuric acid derivative group selected from the class consisting of the sulphuric ester and sulphonic acid groups.

HERMANN SCHUETTE.
MAX WITTWER.